US012413141B2

(12) United States Patent
Cao et al.

(10) Patent No.: US 12,413,141 B2
(45) Date of Patent: Sep. 9, 2025

(54) BACKFEED SOFT-START CIRCUIT FOR STRING PHOTOVOLTAIC INVERTER

(71) Applicants: Huawei Digital Power Technologies Co., Ltd., Shenzhen (CN); SPIC Qinghai Photovoltaic Industry Innovation Center Co., Ltd., Qinghai (CN)

(72) Inventors: Zhen Cao, Shanghai (CN); Lei Shi, Shanghai (CN); Yunfeng Liu, Shanghai (CN); Feng Chong, Xining (CN); Hualong Fan, Xining (CN); Jiajia He, Xining (CN); Shaopan Hou, Xining (CN); Jie Zhang, Xining (CN)

(73) Assignees: Huawei Digital Power Technologies Co., Ltd., Shenzhen (CN); SPIC Qinghai Photovoltaic Industry Innovation Center Co., Ltd., Xining (CN)

(*) Notice: Subject to any disclaimer, the term of this patent is extended or adjusted under 35 U.S.C. 154(b) by 0 days.

(21) Appl. No.: 18/305,215

(22) Filed: Apr. 21, 2023

(65) Prior Publication Data

US 2023/0327543 A1 Oct. 12, 2023

Related U.S. Application Data

(63) Continuation of application No. PCT/CN2020/123400, filed on Oct. 23, 2020.

(51) Int. Cl.
*H02M 1/36* (2007.01)
*H02J 3/38* (2006.01)
(Continued)

(52) U.S. Cl.
CPC .............. *H02M 1/36* (2013.01); *H02J 3/381* (2013.01); *H02S 50/15* (2014.12); *H02J 2300/26* (2020.01); *H02M 3/158* (2013.01)

(58) Field of Classification Search
CPC ......... H02M 1/36; H02M 3/158; H02S 50/15; H02J 3/381; H02J 2300/26
See application file for complete search history.

(56) References Cited

U.S. PATENT DOCUMENTS 8,324,921 B2 * 12/2012 Adest ...................... H02S 50/10
324/761.01
8,872,384 B2 * 10/2014 Stratakos .............. H02M 3/158
307/104
(Continued)

FOREIGN PATENT DOCUMENTS

CN 107659266 A 2/2018
DE 102017005965 A1 * 12/2018
(Continued)

OTHER PUBLICATIONS

Machine Translation JP_2001223377 (Year: 2001).*
(Continued)

*Primary Examiner* — Thienvu V Tran
*Assistant Examiner* — Yahveh Comas Torres
(74) *Attorney, Agent, or Firm* — Leydig, Voit & Mayer, Ltd.

(57) ABSTRACT

A backfeed soft-start circuit for a photovoltaic inverter is provided. The backfeed soft-start circuit includes a plurality of branch switches. A solar photovoltaic array includes a plurality of photovoltaic modules, where the plurality of branch switches are in a one-to-one correspondence with the plurality of photovoltaic modules, and when the plurality of branch switches are turned on, the corresponding photovoltaic modules are connected to the backfeed soft-start circuit; and a primary switching switch. The branch switches is (Continued)

connected to a corresponding photovoltaic module, and the primary switching switch. The primary switching switch is turned on after the branch switch is turned on.

16 Claims, 5 Drawing Sheets

(51) Int. Cl.
    *H02M 3/158*     (2006.01)
    *H02S 50/15*     (2014.01)

(56) References Cited

U.S. PATENT DOCUMENTS

| | | | |
|---|---|---|---|
| 9,397,609 B2 | 7/2016 | Lee et al. | |
| 11,271,404 B2* | 3/2022 | Yang | H02J 3/0012 |
| 11,901,738 B2* | 2/2024 | Moslehi | H10F 19/902 |
| 2015/0107646 A1* | 4/2015 | Fife | H02S 40/32 |
| | | | 136/244 |
| 2018/0006464 A1* | 1/2018 | Judkins | H02S 40/32 |

FOREIGN PATENT DOCUMENTS

| | | | | |
|---|---|---|---|---|
| JP | H10285966 A | * | 10/1998 | |
| JP | 2000174302 A | * | 6/2000 | |
| JP | 2001223377 A | * | 8/2001 | ............. H02S 40/12 |
| JP | 2002026356 A | * | 1/2002 | |
| JP | 2016208677 A | | 12/2016 | |
| KR | 102010315 B1 | * | 10/2019 | |
| WO | WO-2018222320 A1 | * | 12/2018 | ......... H01L 31/0504 |
| WO | 2020019103 A1 | | 1/2020 | |

OTHER PUBLICATIONS

Machine translation DE-102017005965-A1 (Year: 2018).*
Machine translation JP-2000174302—(Year: 2000).*
Machine translation JP-2002026356-A (Year: 2002).*
Machine translation JP_H10285966 (Year: 1998).*
Machine Translation KR_102010315_ (Year: 2019).*

* cited by examiner

BACKFEED SOFT-START CIRCUIT FOR STRING PHOTOVOLTAIC INVERTER

CROSS-REFERENCE TO RELATED APPLICATION

This application a continuation of International Patent Application No. PCT/CN2020/123400, filed on Oct. 23, 2020, the disclosure of which is hereby incorporated by reference in its entirety.

TECHNICAL FIELD

Embodiments of this application relate to the technologies of power electronics, and in particular, to a backfeed soft-start circuit for a string photovoltaic inverter.

BACKGROUND

New energy technologies, such as photovoltaic power generation, have developed rapidly. Photovoltaic power generation means converting solar radiation energy into electrical energy based on a photovoltaic effect of a semiconductor material, for example, generating a direct current by using a photovoltaic module under exposure to light. The photovoltaic module is a core part of a photovoltaic power generation system, is a single module that is formed after a number of single solar cells are connected in series and in parallel, is used to convert solar energy into electrical energy, and may also be referred to as a photovoltaic battery module. Quality of the photovoltaic module directly affects power generation performance of the photovoltaic power generation system, and components age and wear over time. Therefore, it is necessary to test the photovoltaic module of the photovoltaic power generation system.

The photovoltaic module of the photovoltaic power system is usually tested based on electroluminescence (EL). A direct current backfeed current is generated by applying a direct current voltage to a photovoltaic module or a photovoltaic module string. Therefore, the photovoltaic module generates infrared light of a specific intensity. An imaging device such as a charge-coupled device (CCD) camera or another photosensitive device may be used to capture an image of the infrared light generated by the photovoltaic module. A defective photovoltaic module presents an obvious dark spot during imaging, and therefore the defective photovoltaic module can be identified based on this feature. This provides a basis for photovoltaic module improvement and photovoltaic power station maintenance. A common practice is to convert an alternating current in an external power supply or in a mobile power supply into a direct current by using a rectifier. The direct current is transmitted to the photovoltaic module by using a power port on the photovoltaic module, in other words, a direct current backfeed current is generated.

In the conventional technology, in a string photovoltaic inverter, a string solution component that is formed by a number of photovoltaic modules is directly connected to the inverter. A direct current output by the string solution component is boosted by using a DC/DC converter to implement maximum power point tracking (MPPT), in other words, to monitor a power generation voltage in real time and to track maximum voltage and current values, so that a maximum power output is implemented. The direct current voltage boosted by using the DC/DC converter is then converted into an alternating current voltage by using a DC/AC converter and is then tied to a power grid for transmission. Each photovoltaic module is affected differently by external factors such as illumination and the environment, and output power of each photovoltaic module varies. Therefore, a plurality of MPPTs and a plurality of DC/DC converters are required to perform power tracking on each photovoltaic module. However, due to cost limitation, the DC/DC converter may be a unidirectional boost converter, which cannot perform reverse transmission of a voltage and a current. Therefore, when a direct current backfeed current is transmitted to the string solution component, the unidirectional DC/DC converter is operated by using an external bypass switch. Because a bus voltage is high after reverse rectification of the DC/AC converter, a large inrush current is generated on an input side of the DC/DC converter instantaneously when the external bypass switch is switched, causing damage to the inverter. In addition, for the string photovoltaic inverter that uses the string solution component to output the direct current, a plurality of photovoltaic modules are required to be tested at the same time, which brings challenges like a large size of a device, an operation difficulty, and a security risk in a high-voltage operation.

SUMMARY

An objective of this application is to provide a backfeed soft-start circuit for a photovoltaic inverter. The backfeed soft-start circuit is connected between a direct current input side of a DC/AC converter of the photovoltaic inverter and an output side of a solar photovoltaic array. The backfeed soft-start circuit includes: a plurality of branch switches, where the solar photovoltaic array includes a plurality of photovoltaic modules, the plurality of branch switches are in a one-to-one correspondence with the plurality of photovoltaic modules, and when a branch switch is turned on, a corresponding photovoltaic module is connected to the backfeed soft-start circuit; and a primary switching switch, where one end of the branch switch is connected to the corresponding photovoltaic module, and the other end is connected to the primary switching switch. The primary switching switch is turned on after the branch switch is turned on, so that a backfeed current generated through reverse rectification of the DC/AC converter passes through the direct current input side of the DC/AC converter and the backfeed soft-start circuit to the photovoltaic module that is connected to the backfeed soft-start circuit. In this way, turning-on and turning-off of the plurality of branch switches are selectively controlled, which helps flexibly configure a combination and a quantity of photovoltaic modules to be tested. In addition, a surge in the backfeed current is effectively suppressed by operating the primary switching switch and the branch switch, so that the inverter is not damaged by the inrush current.

According to a first aspect, an embodiment of this application provides a backfeed soft-start circuit for a photovoltaic inverter. The backfeed soft-start circuit is connected between a direct current input side of a DC/AC converter of the photovoltaic inverter and an output side of a solar photovoltaic array. The backfeed soft-start circuit includes: a plurality of branch switches, where the solar photovoltaic array includes a plurality of photovoltaic modules, the plurality of branch switches are in a one-to-one correspondence with the plurality of photovoltaic modules, and when a branch switch is turned on, a corresponding photovoltaic module is connected to the backfeed soft-start circuit; and a primary switching switch, where one end of the branch switch is connected to the corresponding photovoltaic module, and the other end is connected to the primary switching switch. The primary switching switch is turned on after the branch switch is turned on, so that a backfeed current generated through reverse rectification of the DC/AC converter passes through the direct current input side of the DC/AC converter and the backfeed soft-start circuit to the photovoltaic module that is connected to the backfeed soft-start circuit.

According to the technical solution described in the first aspect, turning-on and turning-off of the plurality of branch switches are selectively controlled, which helps flexibly configure a combination and a quantity of photovoltaic modules to be tested. In addition, a surge in the backfeed current is effectively suppressed by operating the primary switching switch and the branch switch, so that the inverter is not damaged by the inrush current.

According to the first aspect, in a possible implementation, the backfeed soft-start circuit further includes a current-limiting switch and a current-limiting resistor. The current-limiting switch and the current-limiting resistor are connected in series and are then connected in parallel to the primary switching switch. The current-limiting switch is turned on after the branch switch is turned on. The primary switching switch is turned on a first period of time after the current-limiting switch is turned on. The current-limiting switch is turned off a second period of time after the primary switching switch is turned on. The second period of time is determined based on a bus voltage of the direct current input side of the DC/AC converter.

In this way, a surge in the backfeed current is effectively suppressed by operating the primary switching switch, the branch switch, and the current-limiting switch, so that the inverter is not damaged by an inrush current. Moreover, energy utilization efficiency is guaranteed.

According to the first aspect, in a possible implementation, the backfeed soft-start circuit further includes a current-limiting inductor. The current-limiting switch and the current-limiting resistor are connected in series and are then connected in parallel to the primary switching switch, and a structure formed through parallel connection is then connected in series to the current-limiting inductor.

In this way, the surge of the backfeed current is effectively suppressed by using the current-limiting inductor, so that the inverter is not damaged by the inrush current.

According to the first aspect, in a possible implementation, the backfeed soft-start circuit further includes a current-limiting switch and a current-limiting resistor. The current-limiting switch and the current-limiting resistor are connected in parallel and are then connected in series to the primary switching switch. The primary switching switch is turned on after the branch switch is turned on, and the current-limiting switch is turned on a first period of time after the primary switching switch is turned on.

In this way, the surge in the backfeed current is effectively suppressed by operating the primary switching switch, the branch switch, and the current-limiting switch, so that the inverter is not damaged by the inrush current. Moreover, the energy utilization efficiency is guaranteed.

According to the first aspect, in a possible implementation, the backfeed soft-start circuit further includes a current-limiting inductor. The current-limiting inductor is connected in series to the primary switching switch. The primary switching switch is turned on a first period of time after the branch switch is turned on. The first period of time is determined based on an inductance value of the current-limiting inductor and a quantity of photovoltaic modules connected to the backfeed soft-start circuit.

In this way, the surge of the backfeed current is effectively suppressed by using the current-limiting inductor, so that the inverter is not damaged by the inrush current.

According to the first aspect, in a possible implementation, the backfeed soft-start circuit further includes a buck converter circuit. The buck converter circuit includes an inductor and a switching transistor. The inductor and the switching transistor are connected in series and are then connected in series to the primary switching switch. The switching transistor of the buck converter circuit remains in a turned-on state under control of a pulse width modulation signal, so that the backfeed current passes through the buck converter circuit.

In this way, the surge of the backfeed current is effectively suppressed by the buck converter circuit, so that the inverter is not damaged by the inrush current.

According to the first aspect, in a possible implementation, a value of the backfeed current is adjusted based on the bus voltage of the direct current input side of the DC/AC converter.

In this way, the backfeed current is dynamically adjusted based on the bus voltage.

According to the first aspect, in a possible implementation, the bus voltage of the direct current input side of the DC/AC converter is adjusted to a minimum value before a test starts and before the test ends.

In this way, the bus voltage is adjusted to the minimum value to effectively suppress the inrush current that is generated instantaneously when an on/off switching is performed, so that the inverter is not damaged.

According to the first aspect, in a possible implementation, the branch switch is turned off after the primary switching switch is turned off, so that the photovoltaic module connected to the backfeed soft-start circuit is disconnected from the backfeed soft-start circuit.

In this way, when the backfeed soft-start circuit is disconnected, the primary switching switch is turned off first and then the branch switch is turned off, which helps protect a device.

According to a second aspect, an embodiment of this application provides a photovoltaic inverter. The photovoltaic inverter includes a plurality of bidirectional DC/DC converters. The plurality of bidirectional DC/DC converters are connected to a plurality of photovoltaic modules of a solar photovoltaic array. The photovoltaic inverter applies a reverse rectified voltage to a corresponding photovoltaic module when the plurality of bidirectional DC/DC converters are under pulse control of a pulse width modulation signal.

According to the technical solution described in the second aspect, the plurality of bidirectional DC/DC converters are controlled to effectively suppress a surge in a backfeed current.

According to a third aspect, an embodiment of this application provides a method for performing an electroluminescence test on a solar photovoltaic array. The solar photovoltaic array includes a plurality of photovoltaic modules. A photovoltaic inverter connected to the solar photovoltaic array includes a DC/AC converter. A backfeed soft-start circuit is connected between a direct current input side of the DC/AC converter of the photovoltaic inverter and an output side of the solar photovoltaic array. The backfeed soft-start circuit includes a plurality of branch switches that are in a one-to-one correspondence with the plurality of photovoltaic modules, and a primary switching switch. One end of the branch switch is connected to a corresponding photovoltaic module, and the other end is connected to the primary switching switch. The method includes: turning on one or more corresponding photovoltaic modules of the plurality of branch switches to connect a corresponding photovoltaic module to the backfeed soft-start circuit; turning on the primary switching switch after turning on the one or more of the plurality of branch switches, so that a backfeed current generated through reverse rectification of the DC/AC converter passes through the direct current input side of the DC/AC converter and the backfeed soft-start circuit to the photovoltaic module that is connected to the backfeed soft-start circuit; and detecting a defective photovoltaic module based on electroluminescence of the photovoltaic module connected to the backfeed soft-start circuit under action of the backfeed current.

According to the technical solution described in the third aspect, turning-on and turning-off of the plurality of branch switches are selectively controlled, which helps flexibly configure a combination and a quantity of photovoltaic modules to be tested. In addition, a surge in the backfeed current is effectively suppressed by operating the primary switching switch and the branch switch, so that the inverter is not damaged by an inrush current.

According to the third aspect, in a possible implementation, the backfeed soft-start circuit further includes a current-limiting switch and a current-limiting resistor. The current-limiting switch and the current-limiting resistor are connected in series and are then connected in parallel to the primary switching switch. That the turning on the primary switching switch after turning on the one or more of the plurality of branch switches includes: turning on the current-limiting switch after turning on the one or more of the plurality of branch switches; turning on the primary switching switch a first period of time after the current-limiting switch is turned on; and turning off the current-limiting switch a second period of time after the primary switching switch is turned on, where the second period of time is determined based on a bus voltage of the direct current input side of the DC/AC converter.

In this way, a surge in the backfeed current is effectively suppressed by operating the primary switching switch, the branch switch, and the current-limiting switch, so that the inverter is not damaged by an inrush current. Moreover, energy utilization efficiency is guaranteed.

According to the third aspect, in a possible implementation, the backfeed soft-start circuit further includes a current-limiting switch and a current-limiting resistor. The current-limiting switch and the current-limiting resistor are connected in parallel and are then connected in series to the primary switching switch. That the turning on the primary switching switch after turning on the one or more of the plurality of branch switches includes: turning on the primary switching switch after turning on the one or more of the plurality of branch switches; and turning on the current-limiting switch a first period of time after the primary switching switch is turned on.

In this way, the surge in the backfeed current is effectively suppressed by operating the primary switching switch, the branch switch, and the current-limiting switch, so that the inverter is not damaged by the inrush current. Moreover, the energy utilization efficiency is guaranteed.

According to the third aspect, in a possible implementation, the backfeed soft-start circuit further includes a current-limiting inductor. The current-limiting inductor is connected in series to the primary switching switch. That the turning on the primary switching switch after turning on the one or more of the plurality of branch switches includes: turning on the primary switching switch a first period of time after the one or more of the plurality of branch switches are turned on, where the first period of time is determined based on an inductance value of the current-limiting inductor and a quantity of photovoltaic modules connected to the backfeed soft-start circuit.

In this way, the surge in the backfeed current is effectively suppressed by using the current-limiting inductor, so that the inverter is not damaged by the inrush current.

According to the third aspect, in a possible implementation, a value of the backfeed current is adjusted based on the bus voltage of the direct current input side of the DC/AC converter.

In this way, the backfeed current is dynamically adjusted based on the bus voltage.

According to the third aspect, in a possible implementation, the bus voltage of the direct current input side of the DC/AC converter is adjusted to a minimum value before a test starts and before the test ends.

In this way, the bus voltage is adjusted to the minimum value to effectively suppress the inrush current that is generated instantaneously when an on/off switching is performed, so that the inverter is not damaged.

According to the third aspect, in a possible implementation, when a test ends, the branch switch is turned off after the primary switching switch is turned off, so that the photovoltaic module connected to the backfeed soft-start circuit is disconnected from the backfeed soft-start circuit.

In this way, when the backfeed soft-start circuit is disconnected, the primary switching switch is turned off first and then the branch switch is turned off, which helps protect a device.

BRIEF DESCRIPTION OF DRAWINGS

To describe the technical solutions in embodiments of this application or in the background, the following briefly describes the accompanying drawings for describing embodiments of this application or the background.

DESCRIPTION OF EMBODIMENTS

An embodiment of this application provides a backfeed soft-start circuit for a photovoltaic inverter. The backfeed soft-start circuit is connected between a direct current input side of a DC/AC converter of the photovoltaic inverter and an output side of a solar photovoltaic array. The backfeed soft-start circuit includes: a plurality of branch switches, where the solar photovoltaic array includes a plurality of photovoltaic modules, the plurality of branch switches are in a one-to-one correspondence with the plurality of photovoltaic modules, and when a branch switch is turned on, the corresponding photovoltaic modules are connected to the backfeed soft-start circuit; and a primary switching switch, where one end of the branch switch is connected to the corresponding photovoltaic module, and the other end is connected to the primary switching switch. The primary switching switch is turned on after the branch switch is turned on, so that a backfeed current generated through reverse rectification of the DC/AC converter passes through the direct current input side of the DC/AC converter and the backfeed soft-start circuit to the photovoltaic module that is connected to the backfeed soft-start circuit. In this way, turning-on and turning-off of the plurality of branch switches are selectively controlled, which helps flexibly configure a combination and a quantity of photovoltaic modules to be tested. In addition, a surge in the backfeed current is effectively suppressed by operating the primary switching switch and the branch switch, so that the inverter is not damaged by the inrush current.

Embodiments of this application may be applied to the following application scenarios, for example, a photovoltaic power generation system in which a photovoltaic panel or solar photovoltaic array formed by connecting a plurality of photovoltaic modules in series and in parallel is required to be tested.

Embodiments of this application may be adjusted and improved based on a specific application environment. This is not specifically limited herein.

To make a person skilled in the art understand the solutions in this application better, the following describes embodiments of this application with reference to the accompanying drawings in embodiments of this application.

Figure 1:
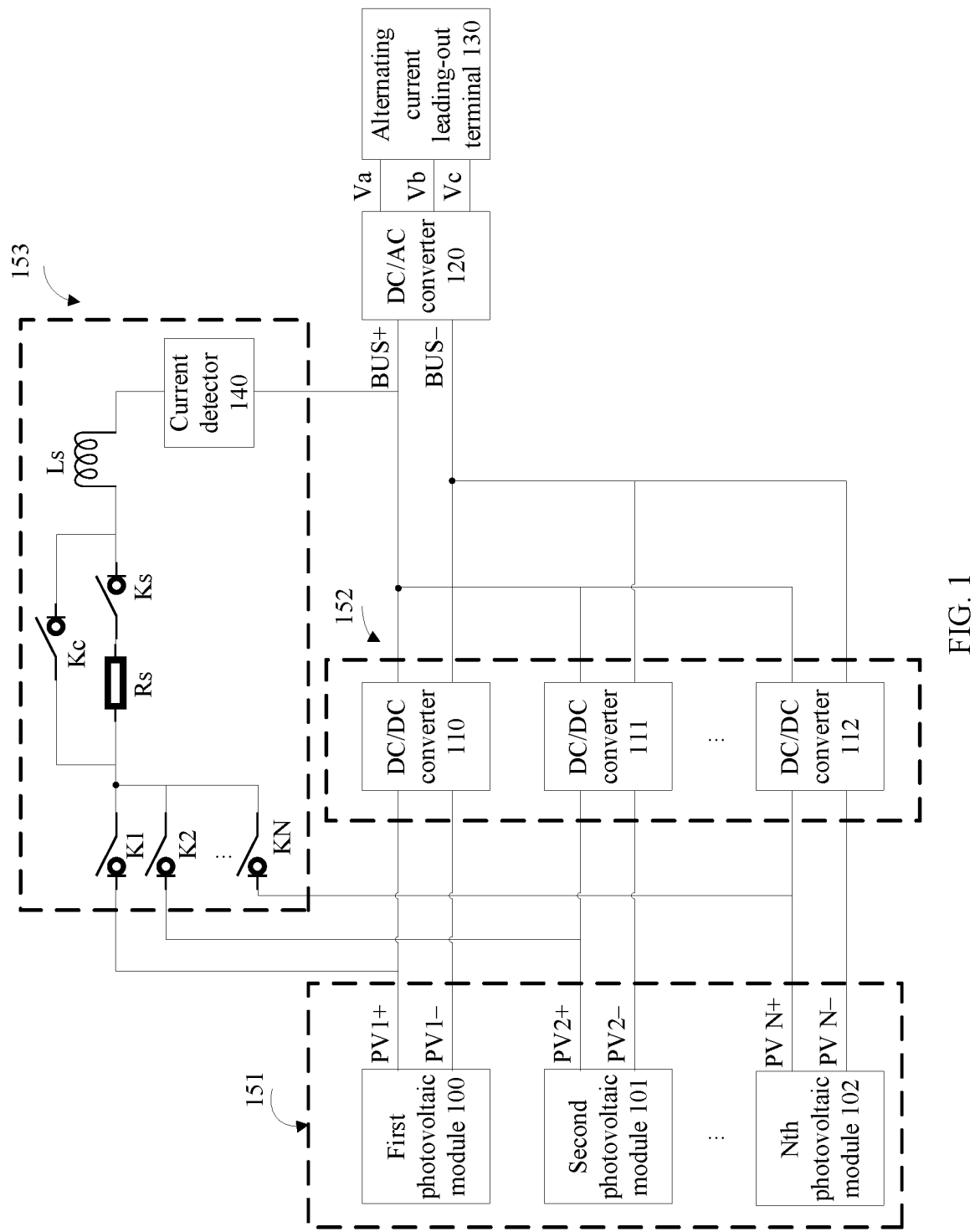
FIG. 1 is a principle diagram of a backfeed soft-start circuit for a string photovoltaic inverter in an implementation according to an embodiment of this application.

FIG. 1 is a principle diagram of a backfeed soft-start circuit for a string photovoltaic inverter in an implementation according to an embodiment of this application. The string photovoltaic inverter outputs a direct current by using a string solution component that includes a plurality of photovoltaic modules. Direct current voltages output by the plurality of photovoltaic modules are boosted respectively by corresponding DC/DC converters, and are then connected in parallel to a same DC/AC converter, so that a maximum power point tracking may be implemented for an individual situation of each photovoltaic module, in other words, to monitor a power generation voltage of an individual photovoltaic module in real time and to implement a maximum power output. Therefore, a direct current output port of each photovoltaic module is connected to a direct current input side of a corresponding DC/DC converter, so that a direct current output by each photovoltaic module is boosted by the DC/DC converter. In other words, a direct current voltage on the direct current input side of the DC/DC converter is less than a direct current voltage on a direct current output side of the DC/DC converter. As shown in FIG. 1, a string solution component 151 includes a plurality of photovoltaic modules numbered from 1 to N, including a first photovoltaic module 100, a second photovoltaic module 101, and an Nth photovoltaic module 102. Herein, the positive integer N is used to represent a total quantity of photovoltaic modules in the string solution component 151. The direct current output port of each photovoltaic module is provided with a positive terminal and a negative terminal. A positive terminal and a negative terminal of a direct current output port of the first photovoltaic module 100 are respectively PV1+ and PV1−. A positive terminal and a negative terminal of a direct current output port of the second photovoltaic module 101 are respectively PV2+ and PV2−. A positive terminal and a negative terminal of a direct current output port of the Nth photovoltaic module 102 are respectively PVN+ and PVN−. The direct current output port of each photovoltaic module is connected to a direct current input side of a corresponding DC/DC converter. The positive terminal PV1+ and the negative terminal PV1− of the direct current output port of the first photovoltaic module 100 are respectively connected to a positive terminal and a negative terminal of a direct current input side of a DC/DC converter 110. The positive terminal PV2+ and the negative terminal PV2− of the direct current output port of the second photovoltaic module 101 are respectively connected to a positive terminal and a negative terminal of a direct current input side of a DC/DC converter 111. The positive terminal PVN+ and the negative terminal PVN− of the direct current output port of the Nth photovoltaic module 102 are respectively connected to a positive terminal and a negative terminal of a direct current input side of a DC/DC converter 112. A plurality of the DC/DC converters that are in a one-to-one correspondence with the plurality of photovoltaic modules in the string solution component 151 forms a DC/DC converter part 152 of the photovoltaic inverter. It should be understood that, after being boosted by the DC/DC converter part 152, a direct current output by the string solution component 151 is converted into an alternating current by a DC/AC converter 120, and is then transmitted to an alternating current leading-out terminal 130. Each of the N photovoltaic modules is provided with a corresponding DC/DC converter for boosting a voltage to achieve maximum power point tracking. Therefore, when the string solution component 151 includes N photovoltaic modules that are required to be tested, the DC/DC converter part 152 is also correspondingly provided with N DC/DC converters. Positive terminals of direct current output terminals of the N DC/DC converters are all connected to a positive terminal of a direct current input side of the DC/AC converter 120. Negative terminals of the direct current output terminals of the N DC/DC converters are all connected to a negative terminal of the direct current input side of the DC/AC converter 120. There is a direct current bus (not shown) between the DC/DC converter part 152 of the photovoltaic inverter and the DC/AC converter 120. A positive direct current bus is connected to the positive terminal of the direct current input side of the DC/AC converter 120, and a negative direct current bus is connected to the negative terminal of the direct current input side of the DC/AC converter 120. In FIG. 1, BUS+ denotes a positive direct current bus voltage, and BUS− denotes a negative direct current bus voltage. A three-phase inverter is used as an example of the DC/AC converter 120, and output three-phase voltages are respectively Va, Vb, and Vc. As an external output interface, the alternating current leading-out terminal 130 may directly output electrical energy to a load, or may return the electrical energy to a power grid.

Still with reference to FIG. 1, a backfeed soft-start circuit 153 is disposed between a direct current output terminal of the string solution component 151 and the direct current input side of the DC/AC converter 120. Because the DC/DC converter part 152 is also arranged between the direct current output terminal of the string solution component 151 and the direct current input side of the DC/AC converter 120, the backfeed soft-start circuit 153 and the DC/DC converter part 152 are alternatively used as a whole. In other words, when the photovoltaic module is required to be tested, the DC/DC converter part 152 may be shielded by using a bypass switch. In this way, a bus voltage that is generated on the direct current input side of the DC/AC converter 120 by using reverse rectification of the DC/AC converter 120 passes through a loop of the backfeed soft-start circuit 153 to be applied to the photovoltaic module. Therefore, a test image is generated based on electroluminescence. The backfeed soft-start circuit 153 includes a plurality of switches, which are respectively numbered K1, K2, . . . , and KN. Herein, when the string solution component 151 includes N photovoltaic modules that are required to be tested, there are N switches in a one-to-one correspondence with the N photovoltaic modules. One end of each switch is connected to a positive terminal of a direct current output terminal of a corresponding photovoltaic module. For example, the switch K1 is connected to the positive terminal PV1+ of the direct current output port of the first photovoltaic module 100. The switch K2 is connected to the positive terminal PV2+ of the direct current output port of the second photovoltaic module 101. The switch KN is connected to the positive terminal PVN+ of the direct current output port of the Nth photovoltaic module 102. The other ends of all the switches are connected to each other in parallel. In other words, one end of each of the N switches K1, K2, . . . , and KN is connected to a positive terminal of a direct current output terminal of a corresponding photovoltaic module of the N photovoltaic modules, and the other end is connected to a same joint. The backfeed soft-start circuit 153 further includes a current detector 140 to measure a value of a direct current that passes through the backfeed soft-start circuit 153. After being connected to the same joint, the N switches K1, K2, . . . , and KN are connected in series to the current detector 140 and another component, to form a main loop of the backfeed soft-start circuit 153. In this way, turning-on and turning-off of the N switches K1, K2, . . . , and KN are selectively controlled, so that all or part of the photovoltaic modules in the string solution component 151 may receive the backfeed current through the backfeed soft-start circuit 153, in other words, a combination and a quantity of photovoltaic modules to be tested can be flexibly configured. In addition, a current flowing through the current detector 140 passes through the another component of the backfeed soft-start circuit 153, and is then transmitted through a switch that is in a turned-on state to a photovoltaic module to be tested. In other words, one or more photovoltaic modules of which corresponding switch(es) is/are in the turned-on state are connected in parallel to the main loop of the backfeed soft-start circuit 153 to shunt the current flowing through the current detector 140.

Still with reference to FIG. 1, the backfeed soft-start circuit 153 further includes a primary switching switch Kc, a current-limiting inductor Ls, a current-limiting resistor Rs, and a current-limiting switch Ks. The current-limiting resistor Rs and the current-limiting switch Ks are connected in series and are then connected in parallel to the primary switching switch Kc to form a switchable loop structure, and the loop structure is connected in series to the joint of the N switches K1, K2, . . . , and KN, the current-limiting inductor Ls, and the current detector 140. Turning-on/turning-off operation of the primary switching switch Kc is performed so that a loop of the current-limiting resistor Rs and the current-limiting switch Ks may be selectively bypassed. When a reverse current is required to be transmitted to the photovoltaic module, the DC/AC converter 120 may work in a reverse rectification state. In other words, a three-phase alternating current on an alternating current output side of the DC/AC converter 120 is rectified to be converted into a direct current bus voltage Vbus of the direct current input side of the DC/AC converter 120. Herein, the direct current bus voltage Vbus represents a voltage difference between the positive direct current bus and the negative direct current bus. When a test starts, the N switches K1, K2, . . . , and KN, the primary switching switch Kc, and the current-limiting switch Ks are all in an initial state of a turned-off state, which means that the backfeed soft-start circuit 153 is in a disconnected state when the photovoltaic inverter works normally, without interfering with normal operation. Assuming that the first photovoltaic module 100 is required to be tested, the switch K1 corresponding to the first photovoltaic module 100 is first turned on for a period of time, and then the current-limiting switch Ks is turned on. The primary switching switch Kc is turned on a period of time t1 after the current-limiting switch Ks is turned on. The current-limiting switch Ks is turned off a period of time t2 after the primary switching switch Kc is turned on. In this way, the reverse current passes through the current detector 140, the current-limiting inductor Ls, the primary switching switch Kc, and the switch K1, and is then transmitted to the first photovoltaic module 100 to implement the test based on the electroluminescence. When the test ends, the primary switching switch Kc is turned off first, and the switch K1 is turned off a period of time t3 after the primary switching switch Kc is turned off. Assuming that a plurality of photovoltaic modules are required to be tested, for example, the first photovoltaic module 100, the second photovoltaic module 101, and the Nth photovoltaic module 102 are all required to be tested, corresponding switches K1, K2, and KN are first turned on. When the test ends, the switches K1, K2, and KN are tuned off at the end. In this way, based on a combination and a quantity of photovoltaic modules to be tested, switches that are of the N switches K1, K2, . . . , and KN and that correspond to the photovoltaic modules to be tested are first turned on, while other switches are kept in a turned-off state. This facilitates flexible configuration of the photovoltaic modules to be tested and ensures operation safety in a high-voltage environment. Moreover, when the test ends, these switches are turned off at the end. In other words, when the backfeed soft-start circuit is disconnected, the primary switching switch is first turned off, and then these switches corresponding to the photovoltaic modules are turned off, which helps protect a device. After the current-limiting switch Ks is turned on for the period of time t1 first, the primary switching switch Kc is turned on for the period of time t2, and the current-limiting switch Ks is then turned off. In this way, the reverse current passes through the loop formed by the current-limiting switch Ks and the current-limiting resistor Rs. Therefore, a loop in which the current-limiting resistor Rs and the current-limiting inductor Ls are connected in series effectively suppresses a surge in the current, and damage to the inverter caused by the inrush current is reduced. Herein, during the period of time t1 when the current-limiting switch Ks is turned on, the current-limiting resistor Rs is connected to a main loop during this time. Therefore, a surge in the reverse current can be effectively avoided, and an effect of reverse current soft-start can be implemented. Then, the primary switching switch Kc is turned on, which is equivalent to bypassing the current-limiting resistor Rs. Therefore, the reverse current is transmitted to the photovoltaic module without passing through the current-limiting resistor Rs. This helps improve energy utilization efficiency. Herein, the current-limiting switch Ks is turned off the period of time t2 after the primary switching switch Kc is turned on, and the period of time t2 is related to the direct current bus voltage Vbus. In other words, the length of time for keeping the primary switching switch Kc turned-on before the current-limiting switch Ks is turned off is adjusted based on a value of the direct current bus voltage Vbus. In this way, the inverter can be effectively protected for being damaged by the inrush current that is generated instantaneously when an on/off switching is performed. In addition, a function of the current-limiting inductor Ls is to suppress a surge in the current. Moreover, a value of the reverse current mainly depends on the direct current bus voltage Vbus. Therefore, before the test starts and before the test ends, the direct current bus voltage Vbus may be adjusted to a minimum value, so that an impact of an inrush current is further reduced. Herein, the reverse current may also be referred to as a backfeed current, which is a current that is reversed and rectified by the DC/AC converter 120 and is then applied to the photovoltaic module to test the photovoltaic module. In this way, the backfeed soft-start circuit 153 is operated, so that a surge of the reverse current can be effectively suppressed when the photovoltaic module is tested. Therefore, the inverter is not damaged by the inrush current, and energy utilization efficiency is effectively maintained.

Still with reference to FIG. 1, in some exemplary embodiments, the DC/DC converter of the DC/DC converter part 152 employs a unidirectional boost converter, which is not suitable for reverse transmission of a voltage and a current from the direct current output terminal to the direct current input terminal of the DC/DC converter. In view of this, an external bypass switch (not shown) is further provided for performing bypass processing on the unidirectional DC/DC converter.

Still with reference to FIG. 1, in some exemplary embodiments, there may be a filter (not shown) between the DC/AC converter 120 and the alternating current leading-out terminal 130. The filter may be configured to suppress switching high-frequency harmonics that are generated under a specific control manner, or may be a grid-tied filter, or may be a tunable filter whose parameter is adjustable to cope with a varying output frequency and an equivalent impedance.

Figure 2:
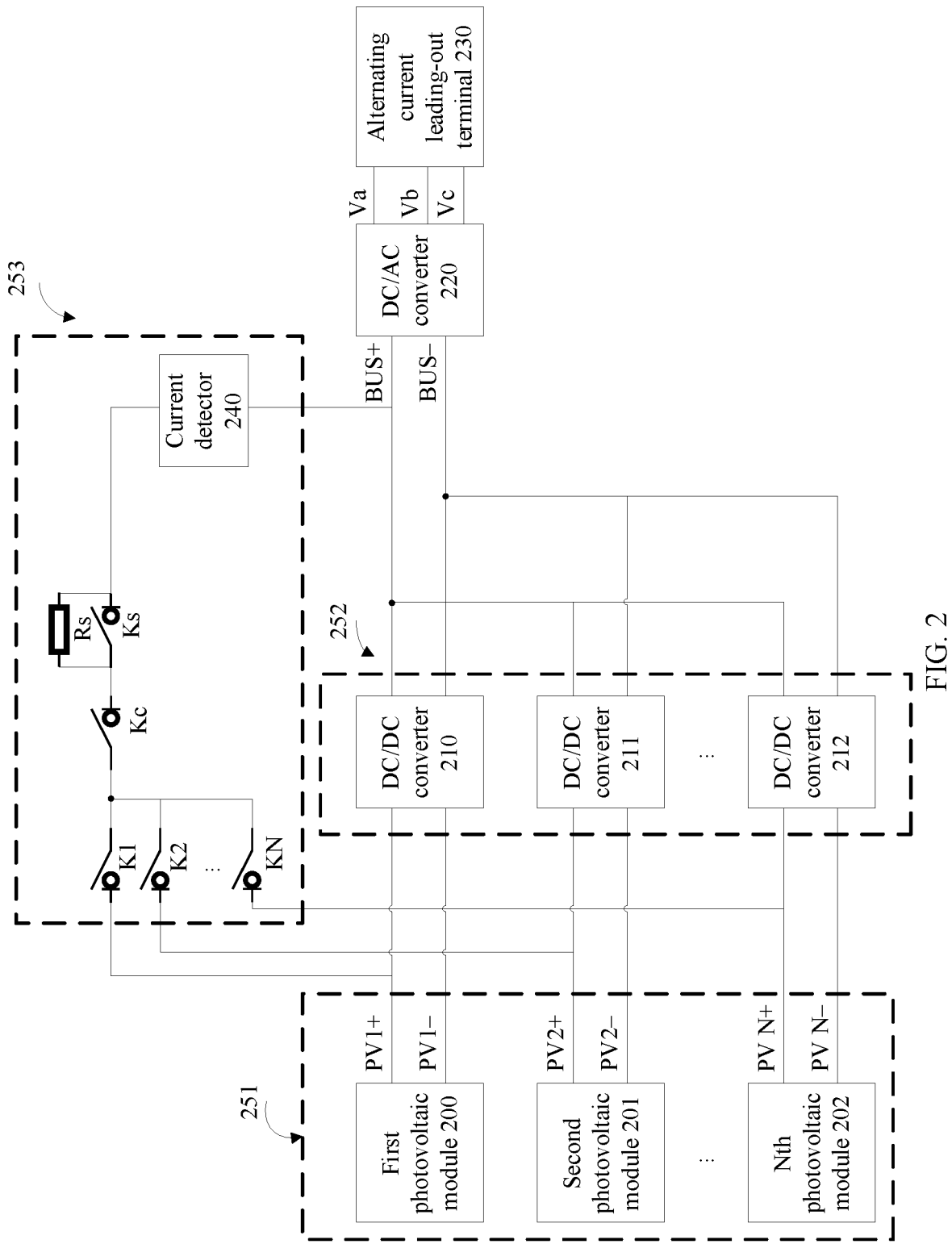
FIG. 2 is a principle diagram of a backfeed soft-start circuit for a string photovoltaic inverter in another implementation according to an embodiment of this application.

FIG. 2 is a principle diagram of a backfeed soft-start circuit for a string photovoltaic inverter in another implementation according to an embodiment of this application. The string photovoltaic inverter outputs a direct current by using a string solution component that includes a plurality of photovoltaic modules. Direct current voltages output by the plurality of photovoltaic modules are boosted respectively by corresponding DC/DC converters, and are then connected in parallel to a same DC/AC converter, so that maximum power point tracking may be implemented for an individual situation of each photovoltaic module, in other words, to monitor a power generation voltage of an individual photovoltaic module in real time and to implement a maximum power output. Therefore, a direct current output port of each photovoltaic module is connected to a direct current input side of a corresponding DC/DC converter, so that a direct current output by each photovoltaic module is boosted by the DC/DC converter. In other words, a direct current voltage on the direct current input side of the DC/DC converter is less than a direct current voltage on a direct current output side of the DC/DC converter. As shown in FIG. 2, a string solution component 251 includes a plurality of photovoltaic modules numbered from 1 to N, including a first photovoltaic module 200, a second photovoltaic module 201, and an Nth photovoltaic module 202. Herein, the positive integer N is used to represent a total quantity of photovoltaic modules in the string solution component 251. The direct current output port of each photovoltaic module is provided with a positive terminal and a negative terminal. A positive terminal and a negative terminal of a direct current output port of the first photovoltaic module 200 are respectively PV1+ and PV1−. A positive terminal and a negative terminal of a direct current output port of the second photovoltaic module 201 are respectively PV2+ and PV2−. A positive terminal and a negative terminal of a direct current output port of the Nth photovoltaic module 202 are respectively PVN+ and PVN−. The direct current output port of each photovoltaic module is connected to a direct current input side of a corresponding DC/DC converter. The positive terminal PV1+ and the negative terminal PV1− of the direct current output port of the first photovoltaic module 200 are respectively connected to a positive terminal and a negative terminal of a direct current input side of a DC/DC converter 210. The positive terminal PV2+ and the negative terminal PV2− of the direct current output port of the second photovoltaic module 201 are respectively connected to a positive terminal and a negative terminal of a direct current input side of a DC/DC converter 211. The positive terminal PVN+ and the negative terminal PVN− of the direct current output port of the Nth photovoltaic module 202 are respectively connected to a positive terminal and a negative terminal of a direct current input side of a DC/DC converter 212. A plurality of the DC/DC converters that are in a one-to-one correspondence with the plurality of photovoltaic modules in the string solution component 251 forms a DC/DC converter part 252 of the photovoltaic inverter. It should be understood that, after being boosted by the DC/DC converter part 252, a direct current output by the string solution component 251 is converted into an alternating current by a DC/AC converter 220, and is then transmitted to an alternating current leading-out terminal 230. Each of the N photovoltaic modules is provided with a corresponding DC/DC converter for boosting a voltage to achieve maximum power point tracking. Therefore, when the string solution component 251 includes N photovoltaic modules that are required to be tested, the DC/DC converter part 252 is also correspondingly provided with N DC/DC converters. Positive terminals of direct current output terminals of the N DC/DC converters are all connected to a positive terminal of a direct current input side of the DC/AC converter 220. Negative terminals of the direct current output terminals of the N DC/DC converters are all connected to a negative terminal of the direct current input side of the DC/AC converter 220. There is a direct current bus (not shown) between the DC/DC converter part 252 of the photovoltaic inverter and the DC/AC converter 220. A positive direct current bus is connected to the positive terminal of the direct current input side of the DC/AC converter 220, and a negative direct current bus is connected to the negative terminal of the direct current input side of the DC/AC converter 220. In FIG. 2, BUS+ denotes a positive direct current bus voltage, and BUS− denotes a negative direct current bus voltage. A three-phase inverter is used as an example of the DC/AC converter 220, and output three-phase voltages are respectively Va, Vb, and Vc. As an external output interface, the alternating current leading-out terminal 230 may directly output electrical energy to a load, or may return the electrical energy to a power grid.

Still with reference to FIG. 2, a backfeed soft-start circuit 253 is disposed between a direct current output terminal of the string solution component 251 and the direct current input side of the DC/AC converter 220. Because the DC/DC converter part 252 is also arranged between the direct current output terminal of the string solution component 251 and the direct current input side of the DC/AC converter 220, the backfeed soft-start circuit 253 and the DC/DC converter part 252 are as a whole alternatively used. In other words, when the photovoltaic module is required to be tested, the DC/DC converter part 252 may be shielded by using a bypass switch. In this way, a bus voltage that is generated on the direct current input side of the DC/AC converter 220 through reverse rectification of the DC/AC converter 220 passes through a loop of the backfeed soft-start circuit 253 to be applied to the photovoltaic module. Therefore, a test image is generated based on electroluminescence. The backfeed soft-start circuit 253 includes a plurality of switches, which are respectively numbered K1, K2, ..., and KN. Herein, when the string solution component 251 includes N photovoltaic modules that are required to be tested, there are N switches in a one-to-one correspondence with the N photovoltaic modules. One end of each switch is connected to a positive terminal of a direct current output terminal of a corresponding photovoltaic module. For example, the switch K1 is connected to the positive terminal PV1+ of the direct current output port of the first photovoltaic module 200. The switch K2 is connected to the positive terminal PV2+ of the direct current output port of the second photovoltaic module 201. The switch KN is connected to the positive terminal PVN+ of the direct current output port of the Nth photovoltaic module 202. The other ends of all the switches are connected to each other in parallel. In other words, one end of each of the N switches K1, K2, ..., and KN is connected to a positive terminal of a direct current output terminal of a corresponding photovoltaic module of the N photovoltaic modules, and the other end is connected to a same joint. The backfeed soft-start circuit 253 further includes a current detector 240 to measure a value of a direct current that passes through the backfeed soft-start circuit 253. After being connected to the same joint, the N switches K1, K2, ..., and KN are connected in series to the current detector 240 and another component, to form a main loop of the backfeed soft-start circuit 253. In this way, turning-on and turning-off of the N switches K1, K2, ..., and KN are selectively controlled, so that all or part of the photovoltaic modules in the string solution component 251 may receive the backfeed current through the backfeed soft-start circuit 253, in other words, a combination and a quantity of photovoltaic modules to be tested can be flexibly configured. In addition, a current flowing through the current detector 240 passes through the another component of the backfeed soft-start circuit 253, and is then transmitted through a switch that is in a turned-on state to a photovoltaic module to be tested. In other words, one or more photovoltaic modules of which corresponding switch(es) is/are in the turned-on state are connected in parallel to the main loop of the backfeed soft-start circuit 253 to shunt the current flowing through the current detector 240.

Still with reference to FIG. 2, the backfeed soft-start circuit 253 further includes a primary switching switch Kc, a current-limiting resistor Rs, and a current-limiting switch Ks. The current-limiting resistor Rs and the current-limiting switch Ks are connected in parallel and are then connected in series to the primary switching switch Kc to form an adjustable loop structure, and the loop structure is then connected in series to the joint of the N switches K1, K2, ..., and KN and the current detector 240. Turning-on/turning-off operation of the current-limiting switch Ks is performed, so that the current-limiting resistor Rs is selectively connected to a main loop. When a reverse current is required to be transmitted to the photovoltaic module, the DC/AC converter 220 may work in a reverse rectification state. In other words, a three-phase alternating current on an alternating current output side of the DC/AC converter 220 is rectified to be converted into a direct current bus voltage Vbus of the direct current input side of the DC/AC converter 220. Herein, the direct current bus voltage Vbus represents a voltage difference between the positive direct current bus and the negative direct current bus. When a test starts, the N switches K1, K2, ..., and KN, the primary switching switch Kc, and the current-limiting switch Ks are all in an initial state of a turned-off state, which means that the backfeed soft-start circuit 253 is in a disconnected state when the photovoltaic inverter works normally, without interfering with normal operation. Assuming that the first photovoltaic module 200 is required to be tested, the switch K1 corresponding to the first photovoltaic module 200 is first turned on for a period of time, and then a primary switching switch Kc is turned on. The current-limiting switch Ks is turned on a period of time t1 after the primary switching switch Kc is turned on. In this way, a reverse current passes through the current detector 140, the current-limiting switch Ks, the primary switching switch Kc, and the switch K1, and is then transmitted to the first photovoltaic module 200 to implement the test based on the electroluminescence. When the test ends, the primary switching switch Kc is first turned off, and the switch K1 is turned off a period of time after the primary switching switch Kc is turned off. Assuming that a plurality of photovoltaic modules are required to be tested, for example, the first photovoltaic module 200, the second photovoltaic module 201, and the Nth photovoltaic module 202 are all required to be tested, corresponding switches K1, K2, and KN are first turned on, and after the test ends, the switches K1, K2, and KN are turned off at the end. In this way, based on a combination and a quantity of photovoltaic modules to be tested, switches that are of the N switches K1, K2, ..., and KN and that correspond to the photovoltaic modules to be tested are first turned on, while other switches are kept in a turned-off state. This facilitates flexible configuration of the photovoltaic modules to be tested and ensures operation safety in a high-voltage environment. When the test ends, these switches are turned off at the end, which helps protect the device. In other words, when the test ends and the backfeed soft-start circuit 253 is disconnected, a switch corresponding to a tested photovoltaic module is turned off after the primary switching switch Kc is tuned off, so that the photovoltaic module connected to the backfeed soft-start circuit 253 is disconnected from the backfeed soft-start circuit 253. Therefore, the photovoltaic module is not damaged by an inrush current voltage that may be generated when the test ends, and the device is protected. The current-limiting switch Ks is turned on a period of time after the primary switching switch Kc is turned on. In this way, the reverse current passes through the current-limiting resistor Rs first. Therefore, a surge in the current is suppressed by the current-limiting resistor Rs, and damage to the inverter caused by the inrush current is reduced. Then, the current-limiting switch Ks is turned on, which is equivalent to making a detour around or bypassing the current-limiting resistor Rs, so that the reverse current is transmitted to the photovoltaic module without passing through the current-limiting resistor Rs. This helps improve energy utilization efficiency. Herein, during the period of time t1 when the primary switching switch Kc is turned on, the current-limiting resistor Rs is connected to the main loop. Therefore, a surge in the reverse current can be effectively avoided, and an effect of reverse current soft-start can be implemented. In addition, a function of the current-limiting inductor Ls is to suppress a surge in the current. Moreover, a value of the reverse current mainly depends on the direct current bus voltage Vbus. Therefore, before the test starts and before the test ends, the direct current bus voltage Vbus may be adjusted to a minimum value, so that an impact of an inrush current is further reduced. Herein, the reverse current may also be referred to as a backfeed current, which is a current that is reversed and rectified by the DC/AC converter 220 and is then applied to the photovoltaic module to test the photovoltaic module. In this way, the backfeed soft-start circuit 253 is operated, so that a surge of the reverse current can be effectively suppressed when the photovoltaic module is tested. Therefore, the inverter is not damaged by the inrush current, and energy utilization efficiency is effectively maintained.

Still with reference to FIG. 2, in some exemplary embodiments, the DC/DC converter of the DC/DC converter part 252 employs a unidirectional boost converter, which is not suitable for reverse transmission of a voltage and a current from the direct current output terminal to the direct current input terminal of the DC/DC converter. In view of this, an external bypass switch (not shown) is further provided for performing bypass processing on the unidirectional DC/DC converter.

Still with reference to FIG. 2, in some exemplary embodiments, there may be a filter (not shown) between the DC/AC converter 220 and the alternating current leading-out terminal 230. The filter may be configured to suppress switching high-frequency harmonics that are generated under a specific control manner, or may be a grid-tied filter, or may be a tunable filter whose parameter is adjustable to cope with a varying output frequency and an equivalent impedance.

Figure 3:
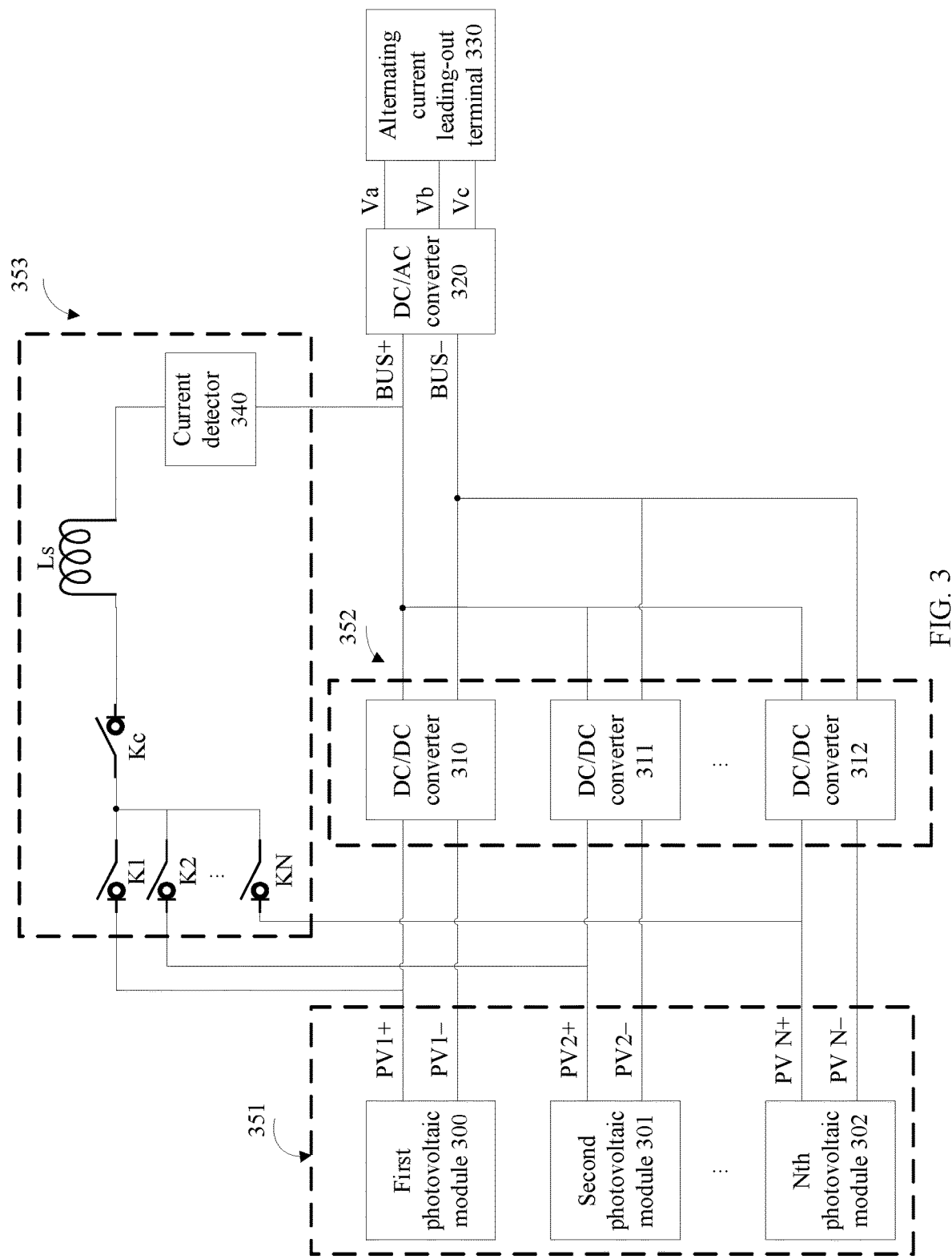
FIG. 3 is a principle diagram of a backfeed soft-start circuit for a string photovoltaic inverter in another implementation according to an embodiment of this application.

FIG. 3 is a principle diagram of a backfeed soft-start circuit for a string photovoltaic inverter in another implementation according to an embodiment of this application. The string photovoltaic inverter outputs a direct current by using a string solution component that includes a plurality of photovoltaic modules. Direct current voltages output by the plurality of photovoltaic modules are boosted respectively by corresponding DC/DC converters, and are then connected in parallel to a same DC/AC converter, so that maximum power point tracking may be implemented for an individual situation of each photovoltaic module, in other words, to monitor a power generation voltage of an individual photovoltaic module in real time and to implement a maximum power output. Therefore, a direct current output port of each photovoltaic module is connected to a direct current input side of a corresponding DC/DC converter, so that a direct current output by each photovoltaic module is boosted by the DC/DC converter. In other words, a direct current voltage on the direct current input side of the DC/DC converter is less than a direct current voltage on a direct current output side of the DC/DC converter. As shown in FIG. 3, a string solution component 351 includes a plurality of photovoltaic modules numbered from 1 to N, including a first photovoltaic module 300, a second photovoltaic module 301, and an Nth photovoltaic module 302. Herein, the positive integer N is used to represent a total quantity of photovoltaic modules in the string solution component 351. The direct current output port of each photovoltaic module is provided with a positive terminal and a negative terminal. A positive terminal and a negative terminal of a direct current output port of the first photovoltaic module 300 are respectively PV1+ and PV1−. A positive terminal and a negative terminal of a direct current output port of the second photovoltaic module 301 are respectively PV2+ and PV2−. A positive terminal and a negative terminal of a direct current output port of the Nth photovoltaic module 302 are respectively PVN+ and PVN−. The direct current output port of each photovoltaic module is connected to a direct current input side of a corresponding DC/DC converter. The positive terminal PV1+ and the negative terminal PV1− of the direct current output port of the first photovoltaic module 300 are respectively connected to a positive terminal and a negative terminal of a direct current input side of a DC/DC converter 310. The positive terminal PV2+ and the negative terminal PV2− of the direct current output port of the second photovoltaic module 301 are respectively connected to a positive terminal and a negative terminal of a direct current input side of a DC/DC converter 311. The positive terminal PVN+ and the negative terminal PVN− of the direct current output port of the Nth photovoltaic module 302 are respectively connected to a positive terminal and a negative terminal of a direct current input side of a DC/DC converter 312. A plurality of the DC/DC converters that are in a one-to-one correspondence with the plurality of photovoltaic modules in the string solution component 351 forms a DC/DC converter part 352 of the photovoltaic inverter. It should be understood that, after being boosted by the DC/DC converter part 352, a direct current output by the string solution component 351 is converted into an alternating current by a DC/AC converter 320, and is then transmitted to an alternating current leading-out terminal 330. Each of the N photovoltaic modules is provided with a corresponding DC/DC converter for boosting a voltage to achieve maximum power point tracking. Therefore, when the string solution component 351 includes N photovoltaic modules that are required to be tested, the DC/DC converter part 352 is also correspondingly provided with N DC/DC converters. Positive terminals of direct current output terminals of the N DC/DC converters are all connected to a positive terminal of a direct current input side of the DC/AC converter 320. Negative terminals of the direct current output terminals of the N DC/DC converters are all connected to a negative terminal of the direct current input side of the DC/AC converter 320. There is a direct current bus (not shown) between the DC/DC converter part 352 of the photovoltaic inverter and the DC/AC converter 320. A positive direct current bus is connected to the positive terminal of the direct current input side of the DC/AC converter 320, and a negative direct current bus is connected to the negative terminal of the direct current input side of the DC/AC converter 320. In FIG. 3, BUS+ denotes a positive direct current bus voltage, and BUS− denotes a negative direct current bus voltage. A three-phase inverter is used as an example of the DC/AC converter 320, and output three-phase voltages are respectively Va, Vb, and Vc. As an external output interface, the alternating current leading-out terminal 330 may directly output electrical energy to a load, or may return the electrical energy to a power grid.

Still with reference to FIG. 3, a backfeed soft-start circuit 353 is disposed between a direct current output terminal of the string solution component 351 and the direct current input side of the DC/AC converter 320. Because the DC/DC converter part 352 is also arranged between the direct current output terminal of the string solution component 351 and the direct current input side of the DC/AC converter 320, the backfeed soft-start circuit 353 and the DC/DC converter part 352 are as a whole alternatively used. In other words, when the photovoltaic module is required to be tested, the DC/DC converter part 352 may be shielded by using a bypass switch. In this way, a bus voltage that is generated on the direct current input side of the DC/AC converter 320 through reverse rectification of the DC/AC converter 320 passes through a loop of the backfeed soft-start circuit 353 to be applied to the photovoltaic module. Therefore, a test image is generated based on electroluminescence. The backfeed soft-start circuit 353 includes a plurality of switches, which are respectively numbered K1, K2, ..., and KN. Herein, when the string solution component 351 includes N photovoltaic modules that are required to be tested, there are N switches in a one-to-one correspondence with the N photovoltaic modules. One end of each switch is connected to a positive terminal of a direct current output terminal of a corresponding photovoltaic module. For example, the switch K1 is connected to the positive terminal PV1+ of the direct current output port of the first photovoltaic module 300. The switch K2 is connected to the positive terminal PV2+ of the direct current output port of the second photovoltaic module 301. The switch KN is connected to the positive terminal PVN+ of the direct current output port of the Nth photovoltaic module 302. The other ends of all the switches are connected to each other in parallel. In other words, one end of each of the N switches K1, K2, ..., and KN is connected to a positive terminal of a direct current output terminal of a corresponding photovoltaic module of the N photovoltaic modules, and the other end is connected to a same joint. The backfeed soft-start circuit 353 further includes a current detector 340 to measure a value of a direct current that passes through the backfeed soft-start circuit 353. After being connected to the same joint, the N switches K1, K2, ..., and KN are connected in series to the current detector 340 and another component, to form a main loop of the backfeed soft-start circuit 353. In this way, turning-on and turning-off of the N switches K1, K2, ..., and KN are selectively controlled, so that all or part of the photovoltaic modules in the string solution component 351 may receive the backfeed current through the backfeed soft-start circuit 353, in other words, a combination and a quantity of photovoltaic modules to be tested can be flexibly configured. In addition, a current flowing through the current detector 340 passes through the another component of the backfeed soft-start circuit 353, and is then transmitted through a switch that is in a turned-on state to a photovoltaic module to be tested. In other words, one or more photovoltaic modules of which corresponding switch(es) is/are in the turned-on state are connected in parallel to the main loop of the backfeed soft-start circuit 353 to shunt the current flowing through the current detector 340.

Still with reference to FIG. 3, the backfeed soft-start circuit 353 further includes a primary switching switch Kc and a current-limiting inductor Ls. The current-limiting inductor Ls and the primary switching switch Kc are connected in series and are then connected in series to the joint of the N switches K1, K2, ..., and KN and the current detector 340. Turning-on/turning-off operation of the primary switching switch Kc is performed, so that a main loop including the current-limiting inductor Ls may be configured into a connected or disconnected state. When a reverse current is required to be transmitted to the photovoltaic module, the DC/AC converter 320 may work in a reverse rectification state. In other words, a three-phase alternating current on an alternating current output side of the DC/AC converter 320 is rectified to be converted into a direct current bus voltage Vbus of the direct current input side of the DC/AC converter 320. Herein, the direct current bus voltage Vbus represents a voltage difference between the positive direct current bus and the negative direct current bus. When a test starts, the N switches K1, K2, ..., and KN and the primary switching switch Kc are all in an initial state of a turned-off state, which means that the backfeed soft-start circuit 353 is in a disconnected state when the photovoltaic inverter works normally, without interfering with normal operation. Assuming that the first photovoltaic module 300 is required to be tested, the switch K1 corresponding to the first photovoltaic module 300 is first turned on for a period of time t1, and then the primary switching switch Kc is turned on. In this way, the reverse current passes through the current detector 340, the current-limiting inductor Ls, the primary switching switch Kc, and the switch K1, and is then transmitted to the first photovoltaic module 300 to implement the test based on the electroluminescence. When the test ends, the primary switching switch Kc is first turned off, and the switch K1 is turned off a period of time after the primary switching switch Kc is turned off. Assuming that a plurality of photovoltaic modules are required to be tested, for example, the first photovoltaic module 300, the second photovoltaic module 301, and the Nth photovoltaic module 302 are all required to be tested, corresponding switches K1, K2, and KN are first turned on. When the test ends, the switches K1, K2, and KN are tuned off at the end. In this way, based on a combination and a quantity of photovoltaic modules to be tested, switches that are of the N switches K1, K2, ..., and KN and that correspond to the photovoltaic modules to be tested are first turned on, while other switches are kept in a turned-off state. This facilitates flexible configuration of the photovoltaic modules to be tested and ensures operation safety in a high-voltage environment. When the test ends, these switches are turned off at the end, which helps protect the device. In other words, when the test ends and the backfeed soft-start circuit 353 is disconnected, a switch corresponding to a tested photovoltaic module is turned off after the primary switching switch Kc is tuned off, so that the photovoltaic module connected to the backfeed soft-start circuit 353 is disconnected from the backfeed soft-start circuit 353. Therefore, the photovoltaic module is not damaged by an inrush current voltage that may be generated when the test ends, and the device is protected. The primary switching switch Kc is turned on the period of time t1 after the switch K1 is turned on, so that the main loop is turned on. In this way, the current-limiting inductor Ls may be configured to suppress a surge of the current. In other words, a larger inductance value of the current-limiting inductor indicates a stronger suppression effect on the surge in the current. The time t1 is related to the inductance value of the current-limiting inductor Ls, and the time t1 is also related to a quantity of photovoltaic modules that are required to be tested. A larger quantity of photovoltaic modules that are required to be tested indicates a longer time t1. When more photovoltaic modules are required to be tested, more switches in the N switches K1, K2, ..., and KN are required to be turned on for a period of time t1 when a test starts, which takes a longer time to wait for energy that is increasingly in need. Moreover, a value of the reverse current mainly depends on the direct current bus voltage Vbus. Therefore, before the test starts and before the test ends, the direct current bus voltage Vbus may be adjusted to a minimum value, so that an impact of an inrush current is further reduced. Herein, the reverse current may also be referred to as a backfeed current, which is a current that is reversed and rectified by the DC/AC converter 320 and is then applied to the photovoltaic module to test the photovoltaic module. In this way, the backfeed soft-start circuit 353 is operated, so that a surge of the reverse current can be effectively suppressed when the photovoltaic module is tested. Therefore, the inverter is not damaged by the inrush current, and energy utilization efficiency is effectively maintained.

Still with reference to FIG. 3, in some exemplary embodiments, the DC/DC converter of the DC/DC converter part 352 employs a unidirectional boost converter, which is not suitable for reverse transmission of a voltage and a current from the direct current output terminal to the direct current input terminal of the DC/DC converter. In view of this, an external bypass switch (not shown) is further provided for performing bypass processing on the unidirectional DC/DC converter.

Still with reference to FIG. 3, in some exemplary embodiments, there may be a filter (not shown) between the DC/AC converter 320 and the alternating current leading-out terminal 330. The filter may be configured to suppress switching high-frequency harmonics that are generated under a specific control manner, or may be a grid-tied filter, or may be a tunable filter whose parameter is adjustable to cope with a varying output frequency and an equivalent impedance.

Figure 4:
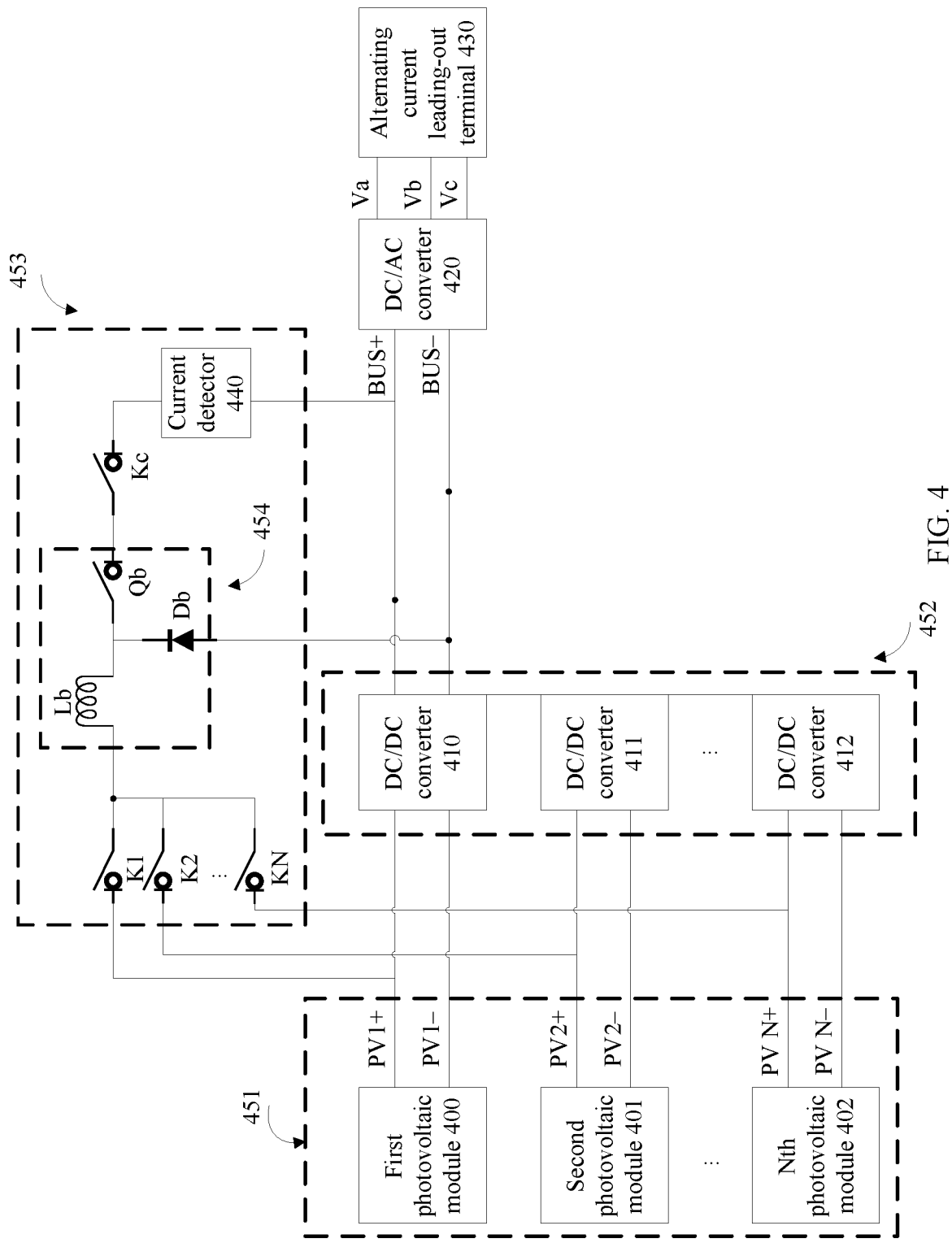
FIG. 4 is a principle diagram of a backfeed soft-start circuit for a string photovoltaic inverter in another implementation according to an embodiment of this application.

FIG. 4 is a principle diagram of a backfeed soft-start circuit for a string photovoltaic inverter in another implementation according to an embodiment of this application. The string photovoltaic inverter outputs a direct current by using a string solution component that includes a plurality of photovoltaic modules. Direct current voltages output by the plurality of photovoltaic modules are boosted respectively by corresponding DC/DC converters, and are then connected in parallel to a same DC/AC converter, so that maximum power point tracking may be implemented for an individual situation of each photovoltaic module, in other words, to monitor a power generation voltage of an individual photovoltaic module in real time and to implement a maximum power output. Therefore, a direct current output port of each photovoltaic module is connected to a direct current input side of a corresponding DC/DC converter, so that a direct current output by each photovoltaic module is boosted by the DC/DC converter. In other words, a direct current voltage on the direct current input side of the DC/DC converter is less than a direct current voltage on a direct current output side of the DC/DC converter. As shown in FIG. 4, a string solution component 451 includes a plurality of photovoltaic modules numbered from 1 to N, including a first photovoltaic module 400, a second photovoltaic module 401, and an Nth photovoltaic module 402. Herein, the positive integer N is used to represent a total quantity of photovoltaic modules in the string solution component 451. The direct current output port of each photovoltaic module is provided with a positive terminal and a negative terminal. A positive terminal and a negative terminal of a direct current output port of the first photovoltaic module 400 are respectively PV1+ and PV1−. A positive terminal and a negative terminal of a direct current output port of the second photovoltaic module 401 are respectively PV2+ and PV2−. A positive terminal and a negative terminal of a direct current output port of the Nth photovoltaic module 402 are respectively PVN+ and PVN−. The direct current output port of each photovoltaic module is connected to a direct current input side of a corresponding DC/DC converter. The positive terminal PV1+ and the negative terminal PV1− of the direct current output port of the first photovoltaic module 400 are respectively connected to a positive terminal and a negative terminal of a direct current input side of a DC/DC converter 410. The positive terminal PV2+ and the negative terminal PV2− of the direct current output port of the second photovoltaic module 401 are respectively connected to a positive terminal and a negative terminal of a direct current input side of a DC/DC converter 411. The positive terminal PVN+ and the negative terminal PVN− of the direct current output port of the Nth photovoltaic module 402 are respectively connected to a positive terminal and a negative terminal of a direct current input side of a DC/DC converter 412. A plurality of the DC/DC converters that are in a one-to-one correspondence with the plurality of photovoltaic modules in the string solution component 451 forms a DC/DC converter part 452 of the photovoltaic inverter. It should be understood that, after being boosted by the DC/DC converter part 452, a direct current output by the string solution component 451 is converted into an alternating current by a DC/AC converter 420, and is then transmitted to an alternating current leading-out terminal 430. Each of the N photovoltaic modules is provided with a corresponding DC/DC converter for boosting a voltage to achieve maximum power point tracking. Therefore, when the string solution component 451 includes N photovoltaic modules that are required to be tested, the DC/DC converter part 452 is also correspondingly provided with N DC/DC converters. Positive terminals of direct current output terminals of the N DC/DC converters are all connected to a positive terminal of a direct current input side of the DC/AC converter 420. Negative terminals of the direct current output terminals of the N DC/DC converters are all connected to a negative terminal of the direct current input side of the DC/AC converter 420. There is a direct current bus (not shown) between the DC/DC converter part 452 of the photovoltaic inverter and the DC/AC converter 420. A positive direct current bus is connected to the positive terminal of the direct current input side of the DC/AC converter 420, and a negative direct current bus is connected to the negative terminal of the direct current input side of the DC/AC converter 420. In FIG. 4, BUS+ denotes a positive direct current bus voltage, and BUS− denotes a negative direct current bus voltage. A three-phase inverter is used as an example of the DC/AC converter 420, and output three-phase voltages are respectively Va, Vb, and Vc. As an external output interface, the alternating current leading-out terminal 430 may directly output electrical energy to a load, or may return the electrical energy to a power grid.

Still with reference to FIG. 4, a backfeed soft-start circuit 453 is disposed between a direct current output terminal of the string solution component 451 and the direct current input side of the DC/AC converter 420. Because the DC/DC converter part 452 is also arranged between the direct current output terminal of the string solution component 451 and the direct current input side of the DC/AC converter 420, the backfeed soft-start circuit 453 and the DC/DC converter part 452 are as a whole alternatively used. In other words, when the photovoltaic module is required to be tested, the DC/DC converter part 452 may be shielded by using a bypass switch. In this way, a bus voltage that is generated on the direct current input side of the DC/AC converter 420 through reverse rectification of the DC/AC converter 420 passes through a loop of the backfeed soft-start circuit 453 to be applied to the photovoltaic module. Therefore, a test image is generated based on electroluminescence. The backfeed soft-start circuit 453 includes a plurality of switches, which are respectively numbered K1, K2, . . . , and KN. Herein, when the string solution component 451 includes N photovoltaic modules that are required to be tested, there are N switches in a one-to-one correspondence with the N photovoltaic modules. One end of each switch is connected to a positive terminal of a direct current output terminal of a corresponding photovoltaic module. For example, the switch K1 is connected to the positive terminal PV1+ of the direct current output port of the first photovoltaic module 400. The switch K2 is connected to the positive terminal PV2+ of the direct current output port of the second photovoltaic module 401. The switch KN is connected to the positive terminal PVN+ of the direct current output port of the Nth photovoltaic module 402. The other ends of all the switches are connected to each other in parallel. In other words, one end of each of the N switches K1, K2, . . . , and KN is connected to a positive terminal of a direct current output terminal of a corresponding photovoltaic module of the N photovoltaic modules, and the other end is connected to a same joint. The backfeed soft-start circuit 453 further includes a current detector 440 to measure a value of a direct current that passes through the backfeed soft-start circuit 453. After being connected to the same joint, the N switches K1, K2, . . . , and KN are connected in series to the current detector 440 and another component, to form a main loop of the backfeed soft-start circuit 453. In this way, turning-on and turning-off of the N switches K1, K2, . . . , and KN are selectively controlled, so that all or part of the photovoltaic modules in the string solution component 451 may receive the backfeed current through the backfeed soft-start circuit 453, in other words, a combination and a quantity of photovoltaic modules to be tested can be flexibly configured. In addition, a current flowing through the current detector 440 passes through the another component of the backfeed soft-start circuit 453, and is then transmitted through a switch that is in a turned-on state to a photovoltaic module to be tested. In other words, one or more photovoltaic modules of which corresponding switch(es) is/are in the turned-on state are connected in parallel to the main loop of the backfeed soft-start circuit 453 to shunt the current flowing through the current detector 440.

Still with reference to FIG. 4, the backfeed soft-start circuit 453 further includes a primary switching switch Kc and a buck converter circuit 454. The buck converter circuit 454 may also be referred to as a buck converter or a buck circuit. The buck converter circuit 454 includes a diode Db, an inductor Lb, and a switch Qb. The inductor Lb and the switch Qb are connected in series and are then connected in series to the primary switching switch Kc, and a structure formed after connection in series is further connected in series to the joint of the N switches K1, K2, . . . , and KN and the current detector 440. A cathode of the diode Db is connected between the inductor Lb and the switch Qb, and an anode is connected to a negative direct current bus, in other words, a negative terminal of the direct current input side of the DC/AC converter 420. By applying a pulse width modulation (PWM) signal to the switch Qb of the buck converter circuit 454, a controlled buck direct current-to-direct current conversion can be achieved. When a reverse current is required to be transmitted to the photovoltaic module, the DC/AC converter 420 may work in a reverse rectification state. In other words, a three-phase alternating current on an alternating current output side of the DC/AC converter 420 is rectified to be converted into a direct current bus voltage Vbus of the direct current input side of the DC/AC converter 420. Herein, the direct current bus voltage Vbus represents a voltage difference between the positive direct current bus and the negative direct current bus. When a test starts, the N switches K1, K2, . . . , and KN and the primary switching switch Kc are all in an initial state of a turned-off state, which means that the backfeed soft-start circuit 453 is in a disconnected state when the photovoltaic inverter works normally, without interfering with normal operation Assuming that the first photovoltaic module 400 is required to be tested, the switch K1 corresponding to the first photovoltaic module 400 is first turned on for a period of time t1, and then the primary switching switch Kc is turned on. The period of time t1 after the primary switching switch Kc is turned on, a PWM control signal is sent to the switch Qb of the buck converter circuit 454, so that the switch Qb remains in a turned-on state to allow a voltage on the photovoltaic module to be tested increases slowly. In this way, the reverse current passes through the current detector 440, the primary switching switch Kc, the switch Qb and the inductor Lb of the buck converter circuit 454, the switch K1, and is then transmitted to the first photovoltaic module 400 to implement the test based on the electroluminescence. When the test ends, the primary switching switch Kc is first turned off, the switch K1 and the switch Qb that is of the buck converter circuit 454 are turned off a period of time after the primary switching switch Kc is turned off. Assuming that a plurality of photovoltaic modules are required to be tested, for example, the first photovoltaic module 400, the second photovoltaic module 401, and the Nth photovoltaic module 402 are all required to be tested, corresponding switches K1, K2, and KN are first turned on. When the test ends, the switches K1, K2, and KN are tuned off at the end. In this way, based on a combination and a quantity of photovoltaic modules to be tested, switches that are of the N switches K1, K2, . . . , and KN and that correspond to the photovoltaic modules to be tested are first turned on, while other switches are kept in a turned-off state. This facilitates flexible configuration of the photovoltaic modules to be tested and ensures operation safety in a high-voltage environment. When the test ends, these switches are turned off at the end, which helps protect the device. In other words, when the test ends and the backfeed soft-start circuit 453 is disconnected, a switch corresponding to a tested photovoltaic module is turned off after the primary switching switch Kc is tuned off, so that the photovoltaic module connected to the backfeed soft-start circuit 453 is disconnected from the backfeed soft-start circuit 453. Therefore, the photovoltaic module is not damaged by an inrush current voltage that may be generated when the test ends, and the device is protected. By controlling the buck converter circuit 454, the buck direct current-to-direct current conversion can be implemented, and a voltage on the photovoltaic module can be increased slowly. Moreover, a value of the reverse current mainly depends on the direct current bus voltage Vbus. Therefore, before the test starts and before the test ends, the direct current bus voltage Vbus may be adjusted to a minimum value, so that an impact of an inrush current is further reduced. Herein, the reverse current may also be referred to as a backfeed current, which is a current that is reversed and rectified by the DC/AC converter 420 and is then applied to the photovoltaic module to test the photovoltaic module. In this way, the backfeed soft-start circuit 453 is operated, so that a surge of the reverse current can be effectively suppressed when the photovoltaic module is tested. Therefore, the inverter is not damaged by the inrush current, and energy utilization efficiency is effectively maintained.

Still with reference to FIG. 4, in some exemplary embodiments, the DC/DC converter of the DC/DC converter part 452 employs a unidirectional boost converter, which is not suitable for reverse transmission of a voltage and a current from the direct current output terminal to the direct current input terminal of the DC/DC converter. In view of this, an external bypass switch (not shown) is further provided for performing bypass processing on the unidirectional DC/DC converter.

Still with reference to FIG. 4, in some exemplary embodiments, there may be a filter (not shown) between the DC/AC converter 420 and the alternating current leading-out terminal 430. The filter may be configured to suppress switching high-frequency harmonics that are generated under a specific control manner, or may be a grid-tied filter, or may be a tunable filter whose parameter is adjustable to cope with a varying output frequency and an equivalent impedance.

With reference to FIG. 1 to FIG. 4, in some exemplary embodiments, the plurality of switches K1, K2, . . . , and KN that are in a one-to-one correspondence with the plurality of photovoltaic modules may be a mechanical switch such as a relay or a contactor, or may be an electronic switch like a switching transistor, like an IGBT or an MOSFET.

Figure 5:
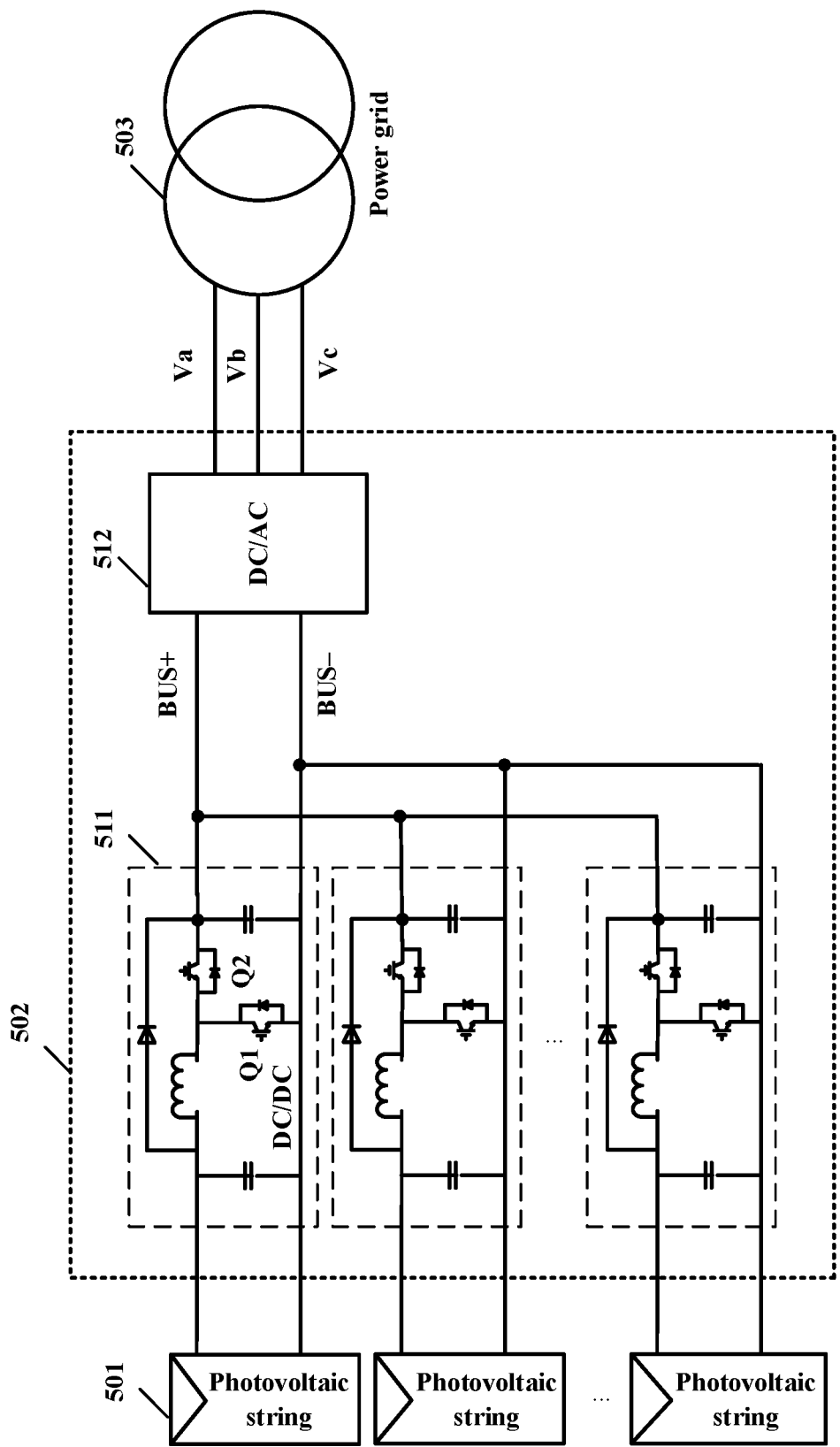
FIG. 5 is a principle diagram of a string photovoltaic inverter in another implementation according to an embodiment of this application.

FIG. 5 is a principle diagram of a string photovoltaic inverter in another implementation according to an embodiment of this application. As shown in FIG. 5, a string photovoltaic inverter outputs a direct current by using a string solution component 501 that includes a plurality of photovoltaic modules. Direct current voltages output by the plurality of photovoltaic modules are boosted respectively by corresponding DC/DC converters, and are then connected in parallel to a same DC/AC converter 512, so that maximum power point tracking may be implemented for an individual situation of each photovoltaic module, in other words, to monitor a power generation voltage of an individual photovoltaic module in real time and to implement a maximum power output. Therefore, a direct current output port of each photovoltaic module is connected to a direct current input side of a corresponding DC/DC converter, so that a direct current output by each photovoltaic module is boosted by the DC/DC converter. In other words, a direct current voltage on the direct current input side of the DC/DC converter is less than a direct current voltage on a direct current output side of the DC/DC converter. Herein, a plurality of the DC/DC converters that are in a one-to-one correspondence with the plurality of photovoltaic modules in the string solution component 501 forms a DC/DC converter part 511 of the photovoltaic inverter. The DC/DC converter of the DC/DC converter part 511 is a bidirectional transformer, which is suitable for reverse transmission from the direct current output terminal to the direct current input terminal. The DC/DC converter part 511 and the DC/AC converter 512 together form a reverse rectifier 502 of the photovoltaic inverter. By internal control of the reverse rectifier 502, for example, PWM pulse control is applied to the DC/DC converter of the DC/DC converter part 511, so that a voltage of reverse rectification can be applied to the photovoltaic module slowly.

Still with reference to FIG. 5, in some exemplary embodiments, there may be a filter (not shown) between the DC/AC converter 512 and the alternating current leading-out terminal 503. The filter may be configured to suppress switching high-frequency harmonics that are generated under a specific control manner, or may be a grid-tied filter, or may be a tunable filter whose parameter is adjustable to cope with a varying output frequency and an equivalent impedance.

With reference to FIG. 1 to FIG. 5, a string solution component including a plurality of photovoltaic modules may be a solar photovoltaic array. The DC/DC converter and the DC/AC converter may be integrated in one device, or may be divided into a plurality of devices. Specific physical forms of the DC/DC converter and the DC/AC converter are not limited in this application. In other words, the inverter may include the DC/DC converter and the DC/AC converter, or may include only the DC/AC converter, and does not include the DC/DC converter. In some exemplary embodiments, the photovoltaic inverter includes a DC/DC converter and a DC/AC converter. In some other exemplary embodiments, the photovoltaic inverter includes only a DC/AC converter.

A specific embodiment provided in this application may be implemented by any one or a combination of hardware, software, firmware, or a solid-state logic circuit, and may be implemented with reference to signal processing, control, and/or a dedicated circuit. The device or the apparatus provided in a specific embodiment of this application may include one or more processors (for example, a microprocessor, a controller, a digital signal processor (DSP), an application-specific integrated circuit (ASIC), or a field programmable gate array (FPGA)). These processors process various computer-executable instructions to control an operation of the device or the apparatus. The device or the apparatus provided in a specific embodiment of this application may include a system bus or a data transmission system that couples all components together. The system bus may include any one of different bus structures or any combination of different bus structures, for example, a memory bus or a memory controller, a peripheral bus, a universal serial bus, and/or a processor or a local bus that uses any one of the plurality of bus structures. The device or apparatus provided in a specific embodiment of this application may be provided separately, may be a part of a system, or may be a part of another device or apparatus.

A specific embodiment provided in this application may include a computer-readable storage medium or be in combination with a computer-readable storage medium, for example, one or more storage devices that can provide non-temporary data storage. The computer-readable storage medium/storage device may be configured to store data, a programmer, and/or instructions. The device or apparatus is enabled to implement related operations by using the data, the programmer, and/or the instructions when a processor of the device or apparatus provided in the specific embodiment of this application executes the data, the programmer, and/or the instructions. The computer-readable storage medium/ storage device may include one or more of the following features: volatile, non-volatile, dynamic, static, readable/ writable, read-only, random access, sequential access, location addressable, file addressable, and content addressable. In one or more exemplary embodiments, the computer-readable storage medium/storage device may be integrated into a device or an apparatus provided in a specific embodiment of this application, or belong to a common system. The computer-readable storage medium/storage device may include an optical storage device, a semiconductor storage device, a magnetic storage device, and/or the like; or may include a random access memory (RAM), a flash memory, a read-only memory (ROM), an erasable programmable read-only memory (EPROM), an electrically erasable programmable read-only memory (EEPROM), a register, a hard disk, a removable magnetic disk, a recordable and/or rewritable optical disk (CD), a digital versatile disc (DVD), a massive storage device, or an appropriate storage medium in any other form.

The foregoing is implementations of embodiments of this application. It should be noted that sequential adjustment, combination, and deletion may be performed on the steps in the methods described in the specific embodiments of this application according to an actual requirement. In the foregoing embodiments, the description of each embodiment has respective focuses. For a part that is not described in detail in an embodiment, reference may be made to related descriptions in other embodiments. It may be understood that the structure shown in the accompanying drawings and embodiments of this application constitutes no specific limitation on the related apparatus or system. In some other embodiments of this application, the related apparatus or system may include more or fewer components than those shown in the specific embodiments and the accompanying drawings; or in the related apparatus or system, some components may be combined, or some components may be split, or components are disposed in different manners. A person skilled in the art understands that various adjustments or changes may be made to operations and details of the method and the device layout recorded in the specific embodiments without departing from the scope of the specific embodiments of this application; and several improvements and polishing may be further made without departing from the principle of this application. The improvements and polishing shall fall within the protection scope of this application.

What is claimed is:

1. A backfeed soft-start circuit for a photovoltaic inverter, wherein the backfeed soft-start circuit is connected between a direct current input side of a DC/AC converter of the photovoltaic inverter and an output side of a solar photovoltaic array; and the backfeed soft-start circuit comprises:
   a plurality of branch switches, wherein the solar photovoltaic array comprises a plurality of photovoltaic modules, the plurality of branch switches are in a one-to-one correspondence with the plurality of photovoltaic modules, and in response to the plurality of branch switches being turned on, the corresponding photovoltaic modules are connected to the backfeed soft-start circuit;
   a primary switching switch, wherein one end of each of the plurality of branch switches is connected to a corresponding photovoltaic module, and the other end is connected to the primary switching switch;
   and at least one of the following:
   a current-limiting switch and a current-limiting resistor, wherein the current-limiting switch and the current-limiting resistor are connected in series and are then connected in parallel to the primary switching switch, or
   a current-limiting inductor, wherein the current-limiting inductor is connected in series to the primary switching switch,
   wherein the primary switching switch is turned on after the branch switch is turned on, so that a backfeed current generated through reverse rectification of the DC/AC converter passes through the direct current input side of the DC/AC converter and the backfeed soft-start circuit to the photovoltaic module that is connected to the backfeed soft-start circuit.

2. The backfeed soft-start circuit according to claim 1, wherein
   the current-limiting switch is turned on after the branch switch is turned on; the primary switching switch is turned on a first period of time after the current-limiting switch is turned on;
   the current-limiting switch is turned off a second period of time after the primary switching switch is turned on; and
   the second period of time is determined based on a bus voltage of the direct current input side of the DC/AC converter.

3. The backfeed soft-start circuit according to claim 2, further comprising:
   a current-limiting inductor,
   wherein the current-limiting switch and the current-limiting resistor are connected in series and are then connected in parallel to the primary switching switch, and
   a structure formed through parallel connection is then connected in series to the current-limiting inductor.

4. The backfeed soft-start circuit according to claim 1, wherein the primary switching switch is turned on a first period of time after the branch switch is turned on; and the first period of time is determined based on an inductance value of the current-limiting inductor and a quantity of photovoltaic modules connected to the backfeed soft-start circuit.

5. The backfeed soft-start circuit according to claim 1, wherein a value of the backfeed current is adjusted based on a bus voltage of the direct current input side of the DC/AC converter.

6. The backfeed soft-start circuit according to claim 5, wherein the bus voltage of the direct current input side of the DC/AC converter is adjusted to a minimum value before a test starts and before the test ends.

7. The backfeed soft-start circuit according to claim 6, wherein the branch switch is turned off after the primary switching switch is turned off, so that the photovoltaic module connected to the backfeed soft-start circuit is disconnected from the backfeed soft-start circuit.

8. The backfeed soft-start circuit according to claim 1, wherein the branch switch is turned off after the primary switching switch is turned off, so that the photovoltaic module connected to the backfeed soft-start circuit is disconnected from the backfeed soft-start circuit.

9. The backfeed soft-start circuit according to claim 1 wherein the photovoltaic inverter comprises a plurality of bidirectional DC/DC converters;
   the plurality of bidirectional DC/DC converters are connected to the plurality of photovoltaic modules of the solar photovoltaic array; and the photovoltaic inverter applies a reverse rectified voltage to the corresponding photovoltaic module in response to the plurality of bidirectional DC/DC converters being under pulse control of a pulse width modulation signal.

10. A method for performing an electroluminescence test on a solar photovoltaic array,
    wherein the solar photovoltaic array comprises: a plurality of photovoltaic modules; a photovoltaic inverter connected to the solar photovoltaic array comprises a DC/AC converter; a backfeed soft-start circuit is connected between a direct current input side of the DC/AC converter of the photovoltaic inverter and an output side of the solar photovoltaic array; the backfeed soft-start circuit comprises a plurality of branch switches that are in a one-to-one correspondence with the plurality of photovoltaic modules, a primary switching switch; and one end of the branch switch is connected to a corresponding photovoltaic module, and the other end is connected to the primary switching switch;
    and at least one of the following:
    a current-limiting switch and a current-limiting resistor, wherein the current-limiting switch and the current-limiting resistor are connected in series and are then connected in parallel to the primary switching switch, or
    a current-limiting inductor, wherein the current-limiting inductor is connected in series to the primary switching switch;
    wherein the method comprises:
    turning on one or more of the plurality of branch switches to connect the corresponding photovoltaic modules to the backfeed soft-start circuit;
    turning on the primary switching switch after turning on the one or more of the plurality of branch switches, so that a backfeed current generated through reverse rectification of the DC/AC converter passes through the direct current input side of the DC/AC converter and the backfeed soft-start circuit to the photovoltaic module connected to the backfeed soft-start circuit; and detecting a defective photovoltaic module based on electroluminescence that is of the photovoltaic module connected to the backfeed soft-start circuit and that is caused by the backfeed current.

11. The method according to claim 10, wherein the turning on the primary switching switch after turning on one or more of the plurality of branch switches comprises:

turning on the current-limiting switch after turning on the one or more of the plurality of branch switches;

turning on the primary switching switch a first period of time after the current-limiting switch is turned on; and turning off the current-limiting switch a second period of time after the primary switching switch is turned on, wherein the second period of time is determined based on a bus voltage of the direct current input side of the DC/AC converter.

12. The method according to claim 10, wherein the turning on the primary switching switch after turning on one or more of the plurality of branch switches comprises:

turning on the primary switching switch a first period of time after the one or more of the plurality of branch switches are turned on, wherein the first period of time is determined based on an inductance value of the current-limiting inductor and a quantity of photovoltaic modules connected to the backfeed soft-start circuit.

13. The method according to claim 10, wherein a value of the backfeed current is adjusted based on a bus voltage of the direct current input side of the DC/AC converter.

14. The method according to claim 13, further comprising:

adjusting the bus voltage of the direct current input side of the DC/AC converter to a minimum value before a test starts and before the test ends.

15. The method according to claim 10, further comprising:

turning off the branch switch after the primary switching switch is turned off in response to an end of the test, so that the photovoltaic module connected to the backfeed soft-start circuit is disconnected from the backfeed soft-start circuit.

16. The method according to claim 10, wherein a value of the backfeed current is adjusted based on a bus voltage of the direct current input side of the DC/AC converter.

* * * * *